Patented Oct. 27, 1936

2,059,088

UNITED STATES PATENT OFFICE 2,059,088

METHOD OF PIGMENTING CELLULOSE ESTER SOLUTIONS

Henry R. Childs, Kingsport, Tenn., assignor, by mesne assignments, to Eastman Kodak Company, Jersey City, N. J., a corporation of New Jersey No Drawing. Application January 22, 1936, Serial No. 60,345

6 Claims. (Cl. 134—79)

This invention relates to the pigmenting of cellulose ester solutions, and more particularly to the pigmenting of cellulose ester solutions to be used in the manufacture of artificial silk. My invention is also applicable to the pigmenting of cellulose ester lacquers.

It has been known, for instance in the manufacture of cellulose ester lacquers, to grind the pigment with a concentrated solution of the entire amount of cellulose ester to be used, and later to grind the resulting pigment paste with additional solvent or diluent. It has also been known, in the manufacture of artificial silk, to grind the pigment with a portion of the cellulose ester solution to be used, and then to mix this highly pigmented portion of the solution with the bulk of the cellulose ester solution.

Both of these methods are attended by great disadvantages. In order to grind large quantities of pigment, the mills used must be very large. Provision must be made for preventing the escape of solvents during the grinding. If it is desired to store the pigment concentrates while awaiting their incorporation with the remaining ingredients of the lacquer or with the bulk of the cellulose ester solution, it is necessary to provide tank space for their storage. If the pigment concentrates are stored for any length of time, the pigment tends to settle out.

I have discovered that cellulose ester solutions may be easily, conveniently, and economically pigmented by means of a mixture prepared by grinding the entire amount of dry pigment with a small portion of dry cellulose ester. This dry mixture may then be agitated directly with the cellulose ester solution to be pigmented, or it may be dispersed in a small amount of solvent for the cellulose ester in the dry mixture, and this dispersion mixed with the cellulose ester solution to be pigmented. In the latter case, in making up the cellulose ester solution to be pigmented, account must be taken of the amount of solvent to be added as a part of the pigment dispersion, in order that the final concentration of the pigmented cellulose ester solution shall be correct. The cellulose ester with which the pigment is ground should preferably be the same as that into whose solution the pigment is to be incorporated. It must, of necessity, be soluble in the solvent or solvent mixture used in the solution to be pigmented. If the dry mixture is first dispersed in a small amount of solvent, the solvent should preferably be the same as that in the solution to be pigmented. It must, at least, be compatible with the latter solvent, without precipitating from solution any cellulose ester present.

The following examples will illustrate the pigmentation of cellulose acetate spinning solutions for the manufacture of artificial silk.

*Example I.*—A dry ground titanium oxide pigment is mixed with an equal weight of cellulose acetate which has been ground to pass an 80-mesh screen. The mixture is placed in a ball mill, and the mill is rotated for 48 hours. The loose, collective groups of pigment particles, into which dry ground pigments always form, are thus broken down, and dispersed into the cellulose acetate to give an intimate mixture of the minute, individual pigment particles with the cellulose acetate. This dry mixture can be added directly to the spinning solution to be pigmented, and thoroughly incorporated therein with approximately the same amount of agitation as is required for incorporating a liquid pigment concentrate. The spinning solution, before pigmenting, may consist of 25% cellulose acetate, 73% acetone, and 2% water. The mixture of pigment and cellulose acetate may be added in an amount sufficient to give 1½ to 2% titanium dioxide, based on the weight of the cellulose acetate. Upon agitation, the ground cellulose acetate dissolves, leaving the pigment suspended, thoroughly dispersed, in the spinning solution.

*Example II.*—Four pounds of dry ground titanium dioxide was mixed with three pounds of cellulose acetate which had been ground to pass an 80-mesh screen. The mixture was placed in a ball mill, and the mill was rotated. Samples were removed at intervals and incorporated into portions of an unpigmented cellulose acetate spinning solution by agitation. These portions were then passed through a candle filter, such as is in common use in filtering cellulose ester spinning solutions just prior to their passage through the spinneret. The portions of pigmented spinning solution thus made up were large enough so that solution could be passed through the candle filter for 2.5 hours without filtering the entire portion. The pressure necessary to put the pigmented spinning solution through the candle filter was measured at the beginning of the filtration, and at the end of 2.5 hours. A relatively low pressure required for filtering the pigmented spinning solution, and in particular a filter pressure which remains the same, at the end of 2.5 hours of passage of the pigmented spinning solution, as it was at the beginning of the filtration, indicates uniform dispersion of the pigment in the spinning solution. In addition, ash was determined in the filtered solution. The results obtained in this example were as follows:

| Sample No. | Hours of dry ball milling | Hours duration of filter test | Candle filter pressure at start | Candle filter pressure at end | Percent ash |
|---|---|---|---|---|---|
| 1 | 20 | 2.5 | 330 | 354 | 1.47 |
| 2 | 72 | 2.5 | 250 | 240 | 1.64 |
| 3 | 72 | 2.5 | 240 | 240 | 1.68 |
| 4 | 144 | 2.5 | 200 | 200 | 1.70 |

It will be seen that, in the case of the first sample, which was ball-milled for only 20 hours, the candle filter pressure was high, and increased as the filtration proceeded, while with the samples milled for 72 or 144 hours, the candle filter pressure was relatively low, and did not increase during the filtration. In the case of Sample No. 3, the dry mixture from the ball milling was sifted before being incorporated in the spinning solution. It will be observed that this made very little difference on either the candle filter pressure or the percentage of ash in the filtered solution, indicating that practically no large pigment particles had remained in the dry mixture after 72 hours of ball-milling. It will be noticed that the percentage of ash in the filtered solution was practically the same in the case of the samples ball-milled 72 hours, ball-milled 72 hours and sifted, or ball-milled 144 hours, while in the case of the sample ball-milled only 20 hours, the ash was low. The low ash shows, of course, that not so much pigment had passed through the candle filter, per amount of spinning solution, as in the case of the other samples. This, again, indicates the presence of large pigment particles which did not pass through the candle filter.

In the above example, it is evident that 20 hours' ball-milling was insufficient to effect thorough dispersion of the titanium dioxide pigment in the cellulose acetate, whereas 72 hours was sufficient. With other pigments or other mills, the time required might be different. However, the necessary time of milling in any given case can be readily determined. Namely, the dry mixture of pigment and cellulose ester should be milled until, after its incorporation in the spinning solution, the pressure necessary to pass the pigmented spinning solution through a candle filter does not increase during 2.5 hours, and further milling of the dry mixture does not appreciably increase the percentage of ash in the candle-filtered spinning solution.

It will be understood that the above examples are merely illustrative, and that I am not to be limited thereby, except as indicated in the appended claims. The pigment, of course, need not be a white pigment, but may be of any desired color. The proportion of pigment added may be varied widely. Mills other than ball mills may be used. Other cellulose esters, such as cellulose acetate-propionate, cellulose acetate-butyrate, etc., which are suitable for artificial silk or for lacquer manufacture may be used in place of cellulose acetate. It is not advisable, however, to attempt to employ this method with cellulose nitrate, on account of the fire hazard involved in grinding dry cellulose nitrate.

Some of the advantages gained by the use of my novel method of pigmenting cellulose ester solutions are the following. The size of the ball mill required for a given output of dispersed pigment is reduced. No provision need be made for preventing the escape of solvent from the mill in which the dry pigment dispersion is made. The dry pigment dispersion can be stored in barrels or bins, without the use of the more expensive tanks or drums. The dry pigment dispersion can be stored indefinitely without the pigment settling out. Filtration tests in a filter press have shown that when a dry mixture of pigment and cellulose ester, ball-milled until it meets the requirements set forth above, is mixed with sufficient solvent so that the resulting pigment concentrate has the same percentage composition as a concentrate made by grinding the pigment, cellulose ester and solvent together, the pigment is more thoroughly dispersed in the former concentrate than in the latter. In a particular case, under 80 lbs. pressure, 560 cc. of the former concentrate passed the filter in 9 minutes, before filtration was automatically stopped by plugging of the pores of the filter, while only 230 cc. of the latter concentrate passed before filtration was automatically stopped at the end of 7.5 minutes.

What I claim as my invention and desire to be secured by Letters Patent of the United States is:

1. A process of pigmenting cellulose ester solutions, comprising grinding the dry pigment with a small portion of dry cellulose organic acid ester and incorporating the resulting mixture into the cellulose ester solution to be pigmented, the duration of the dry grinding being such that the pressure required to pass the pigmented cellulose ester solution through a candle filter does not increase during 2.5 hours' continuous filtration, and that further grinding of the dry mixture does not appreciably increase the percentage of ash in the candle-filtered solution.

2. The process of claim 1, in which the dry mixture resulting from the grinding of dry pigment with dry cellulose ester is incorporated directly into the cellulose ester solution to be pigmented.

3. The process of claim 1, in which the dry mixture resulting from the grinding of dry pigment with dry cellulose ester is dispersed in a small amount of solvent for the cellulose ester, and the resulting dispersion is mixed with the cellulose ester solution to be pigmented.

4. The process of claim 1, in which the cellulose ester solution to be pigmented is a spinning solution.

5. The process of claim 1, in which the cellulose ester solution to be pigmented is a cellulose acetate solution.

6. The process of claim 1, in which the pigment is a titanium oxide pigment.

HENRY R. CHILDS.